United States Patent
Sauder et al.

(10) Patent No.: US 6,748,885 B2
(45) Date of Patent: Jun. 15, 2004

(54) VACUUM SEED METER AND DISPENSING APPARATUS

(75) Inventors: Gregg A. Sauder, Tremont, IL (US);
Kenneth R. Dill, Hopedale, IL (US);
Don L. Dunlap, Pekin, IL (US);
Kenneth P. Sauder, Tremont, IL (US);
Derek A. Sauder, Tremont, IL (US);
Jeremy E. Zobrist, Congerville, IL (US)

(73) Assignee: Precision Planting, Inc., Tremont, IL (US)

( * ) Notice: Subject to any disclaimer, the term of this patent is extended or adjusted under 35 U.S.C. 154(b) by 0 days.

(21) Appl. No.: 10/248,298

(22) Filed: Jan. 7, 2003

(65) Prior Publication Data

US 2003/0116068 A1 Jun. 26, 2003

Related U.S. Application Data

(63) Continuation of application No. 09/683,411, filed on Dec. 21, 2001, now Pat. No. 6,516,733.

(51) Int. Cl.[7] ................................................. A01C 7/00
(52) U.S. Cl. ........................ 111/180; 111/181; 221/211
(58) Field of Search ................................. 111/180, 179, 111/186, 903, 200, 181, 182; 221/211, 278

(56) References Cited

U.S. PATENT DOCUMENTS

| | | | |
|---|---|---|---|
| 2,991,909 A | 7/1961 | Lamazou et al. | |
| 3,156,201 A | 11/1964 | Tweedale | |
| 3,498,241 A | * 3/1970 | Fischer | ........................ 111/184 |
| 3,533,535 A | 10/1970 | Knapp | |
| 3,552,601 A | 1/1971 | Hansen et al. | |
| 3,572,547 A | 3/1971 | Walberg | |
| 3,622,042 A | 11/1971 | Fischer | |
| 3,636,897 A | 1/1972 | Brink | |
| 3,670,671 A | 6/1972 | Lienemann et al. | |
| 3,749,035 A | 7/1973 | Cayton et al. | |
| 3,757,996 A | * 9/1973 | Linemann et al. | .......... 221/211 |
| 3,790,026 A | * 2/1974 | Neumeister | ................ 221/211 |
| 3,848,552 A | * 11/1974 | Bauman et al. | ............. 111/180 |
| 3,881,631 A | 5/1975 | Loesch et al. | |

(List continued on next page.)

FOREIGN PATENT DOCUMENTS

| | | |
|---|---|---|
| EP | 0140699 | 5/1985 |
| EP | 0141638 | 5/1985 |
| EP | 0156637 A2 | 10/1985 |
| GB | 30 03 919 | 8/1981 |

OTHER PUBLICATIONS

ATI, Inc., Monosem MS, mini–seed vacuum planter, versions A, B, C, D, E, for reliable precision planting of vegetable seeds; Lenexa, KS 66219.

S.I. Distributing Inc., S.I. Belt Meter; St. Marys, Ohio 45885.

Primary Examiner—Victor Batson
(74) Attorney, Agent, or Firm—Larkin Hoffman Daly & Lindgren, Ltd.; Thomas J. Oppold, Esq.

(57) ABSTRACT

An agricultural seed planter and seed meter therefore, wherein the seed meter includes a rotary vacuum drum disposed within a stationary housing to entrain individual seeds on an annular circumferential periphery of the drum. As the entrained seeds rotate with the drum the seeds are singulated before being released from said vacuum drum. The seed metering and dispensing device is adapted to be mounted below the seed hopper to discharge the seeds into a seed tube as is conventional, or alternatively the seed metering and dispensing device is preferably adapted for mounting just above the soil surface and between the furrow opening assembly and furrow closing wheel assembly of a conventional agricultural planter such that the seeds are deposited directly into the seed furrow.

6 Claims, 9 Drawing Sheets

U.S. PATENT DOCUMENTS

| | | | |
|---|---|---|---|
| 3,891,120 A | * | 6/1975 | Loesch et al. ............... 221/2 |
| 3,990,606 A | | 11/1976 | Gugenhan |
| 4,009,668 A | | 3/1977 | Brass et al. |
| 4,023,509 A | | 5/1977 | Hanson |
| 4,037,755 A | | 7/1977 | Reuter |
| 4,074,830 A | | 2/1978 | Adams |
| 4,085,862 A | * | 4/1978 | Steffen ......................... 221/8 |
| 4,094,444 A | | 6/1978 | Willis |
| 4,145,980 A | | 3/1979 | Boots |
| 4,148,414 A | | 4/1979 | Parks, Jr. |
| 4,159,064 A | * | 6/1979 | Hood ............................ 221/8 |
| 4,162,744 A | | 7/1979 | Barker et al. |
| 4,184,610 A | * | 1/1980 | Thiele et al. ............... 221/278 |
| 4,210,260 A | | 7/1980 | Luttrell |
| 4,239,126 A | * | 12/1980 | Dobson et al. ............ 221/211 |
| 4,241,849 A | | 12/1980 | Harrer |
| 4,265,368 A | | 5/1981 | Feltrop |
| 4,285,444 A | | 8/1981 | Tye |
| 4,306,509 A | | 12/1981 | Hassan et al. |
| 4,449,642 A | | 5/1984 | Dooley |
| 4,450,979 A | | 5/1984 | Deckler |
| 4,613,056 A | | 9/1986 | Olson |
| 4,688,698 A | | 8/1987 | Holland |
| 4,703,868 A | | 11/1987 | Shaw |
| 4,793,511 A | | 12/1988 | Ankum et al. |
| 4,898,108 A | | 2/1990 | McDermott |
| 5,170,909 A | | 12/1992 | Lundie et al. |
| 5,231,940 A | | 8/1993 | Tjeerdsma |
| 5,392,707 A | | 2/1995 | Romans |
| 5,402,741 A | | 4/1995 | Truax et al. |
| 5,431,117 A | * | 7/1995 | Steffens et al. ............. 111/180 |
| 5,501,366 A | | 3/1996 | Fiorido |
| 5,542,364 A | | 8/1996 | Romans |
| 5,655,468 A | * | 8/1997 | Ledermann et al. ........ 111/164 |
| 5,720,233 A | | 2/1998 | Lodico et al. |
| 5,740,747 A | | 4/1998 | Stufflebeam et al. |
| 5,784,985 A | | 7/1998 | Lodico et al. |
| 5,992,338 A | | 11/1999 | Romans |
| 6,109,193 A | | 8/2000 | Crabb et al. |
| 6,142,086 A | | 11/2000 | Richard |
| 6,173,664 B1 | | 1/2001 | Heimbuch |
| 6,216,615 B1 | | 4/2001 | Romans |
| 6,247,417 B1 | | 6/2001 | Heimbuch |
| 6,516,733 B1 | * | 2/2003 | Sauder et al. ............... 111/180 |

* cited by examiner

VACUUM SEED METER AND DISPENSING APPARATUS

CROSS REFERENCE TO RELATED APPLICATIONS

This is a continuation of U.S. patent application Ser. No. 09/683,411 filed on Dec. 21, 2001 now U.S. Pat. No. 6,516,733. Priority is claimed thereto under 35 U.S.C. § 120.

BACKGROUND OF INVENTION

1. Field of the Invention

The present invention relates generally to mechanisms used in agricultural planting machines for selecting and dispensing individual seeds and more particularly to such mechanisms which employ a vacuum pressure to singulate and dispense the seeds.

2. Description of the Related Art

It is well recognized that uniformity of seed spacing in the seed furrow is essential for achieving a field's maximum crop yield potential and thus the profitability of the farmer's operation. Modern agricultural planters use various types of seed metering devices which, ideally, are designed to select and dispense individual seeds at regular intervals. Unfortunately, however, most of these commercially available seed metering devices often fail to perform as ideally designed in that the seed meter will occasionally miss or skip a seed thereby resulting in gaps in the seed spacing, or, alternatively, the seed meter will dispense two or more seeds at a time (i.e., doubles or triples) instead of dispensing individual seeds.

The cause of most of skips or doubles can be attributed to factors such as lack of proper maintenance of the seed meter or the failure on the part of the farmer to change out components of the seed meter when switching between planting seeds of different shapes or sizes. Despite the knowledge that failure to perform proper maintenance or failure to change out components of the meter when switching to planting seeds of different sizes and shapes may result in lower yields, many farmers elect not to engage in these time-consuming practices during the rush of the planting season. Accordingly, there is a need in the agricultural industry for a seed metering device that requires little maintenance and one that can plant a wide range of different sizes and shapes of seeds and which is further capable of planting a wide range of seed populations without having to change out components, thereby minimizing down-time, while still maintaining desired uniformity and accuracy in selecting and dispensing individual seeds.

As identified above, there are various types of seed metering devices currently being used on modern conventional agricultural seed planters. These various types of seed meters are substantially divided into two categories on the basis of the seed selection mechanism employed, namely, mechanical or pneumatic. The commercially available mechanical meters include finger-pickup meters such as disclosed in U.S. Pat. No. 3,552,601, cavity-disk meters such as disclosed in U.S. Pat. No. 4,613,056, and belt meters such as disclosed in U.S. Pat. No. 5,992,338. Commercially available pneumatic meters include vacuum-type meters such as disclosed in U.S. Pat. No. 5,501,366, and compressed air meters. There are also commercially available meters that combine the seed selection mechanisms of both mechanical and pneumatic meters such as disclosed in U.S. Pat. No. 4,074,830. Of the various types of seed meters, vacuum-type meters offer certain advantages and desirable features over the other types of meters.

In general, most vacuum-type meters, such as those disclosed in U.S. Pat. Nos. 4,241,849; 4,285,444; 4,688,698; 4,793,511; 5,170,909; 5,392,707; 5,501,366; 5,542,364; 5,740,747; and 6,109,193, utilize a rotary disk or plate having one or more concentric circular rows of equally spaced apertures. A vacuum is applied to one side of the disk thereby creating a negative pressure differential on opposite sides of the disk. In use, the disk rotates through a seed reservoir located on the opposite side of the disk to which the vacuum is applied. The negative pressure differential causes seeds to be held or entrained over the apertures as the apertures rotate through the seed reservoir. Excess seeds are then removed by a seed stripper and the individual seeds that remain entrained over the apertures are then dispensed one at a time at a discharge point located on the path of travel of the apertures before the apertures re-enter the seed reservoir.

Another vacuum-type meter as disclosed in U.S. Pat. No. 6,142,086 discloses the utilization of a rotatable vacuum drum as opposed to a rotatable vacuum disk or plate as part of the seed selection mechanism. The vacuum drum of the '086 patent includes a row of circumferentially spaced apertures about the outer circumferential periphery of the drum and further includes a seed tube for "plucking the seeds" off the rotatable drum. The use of a seed tube to "pluck" the seeds from the rotating drum may potentially damage the seeds which may effect the ability of the seed to germinate.

Those skilled in the art recognize that most of the commercially available vacuum-type meters typically require less maintenance than other types of meters since vacuum-type meters usually have fewer moving parts that tend to wear with use, particularly as compared to the finger-pickup type meters. Additionally, with vacuum-type meters, usually a single vacuum disk or drum can be used for planting a wider range of seed shapes and sizes without the need for changing out components and without sacrificing the performance of the seed meter. Finger-pickup meters, on the other hand, usually require the farmer to change out the backing plates or the seed stripper inserts when switching among seeds having a different sizes or shapes in order to maintain the same degree of performance. Similarly, with belt-type meters or seed cavity disk meters, it is likewise usually necessary to change the belts or the cavity disks, respectively, to accommodate different seed sizes and shapes.

Thus, while vacuum-type meters offer certain desired advantages over mechanical meters, most commercially available vacuum-disk meters suffer from certain other disadvantages relating to their manufacture. One particular problem relates to maintenance of the vacuum or pressure differential, particularly with respect to vacuum-type meters that utilize a vacuum disk as opposed to a vacuum drum. In vacuum-disk meters, the sealing arrangement between the disk and the housing must be sufficiently effective to minimize localized variations in the vacuum around the circumference of the disk. To minimize any irregularities between the seal of the disk and the housing, the disk is typically manufactured from a rather heavy stainless steel plate that must be precisely rolled and machined under very fine tolerances. Thus, vacuum-disks are typically expensive and difficult to manufacture. Accordingly, there is a need in the industry to provide a metering device which offers the features and advantages of a vacuum-type meter, but which is more easily manufactured and does not require the expensive machining operations and fine tolerances. Additionally, there is a need in the industry for a vacuum-type meter which will gently release the seeds such that the seeds are not damaged when discharged.

Furthermore, recent technological advances in global positioning systems (GPS) and availability of satellite imagery and yield monitors on harvesting equipment have enabled farmers to map their fields based on a number of conditions. Farmers are now able to match seed varieties to the various soil conditions that may be encountered in any given field. For example, a particular variety of seed may produce higher yields in sandy soil than in clay or loess soils which may be encountered based on the topography of the field. Additionally, certain varieties of seeds may have more disease resistance or will better tolerate field conditions where there may occasionally be standing water due to poor drainage. Therefore, there is a need in the industry for a planting system which allows the planter to switch between different varieties of seeds while on-the-go as the planter encounters different soil conditions in the field or where certain areas of the field require different disease resistance.

Finally, in most modern conventional agricultural planters, the seed meters (whether finger-pickup type, vacuum-disk type, cavity-disk type or belt-type) are typically mounted just below the seed hopper of the planter such that a constant supply of seeds from the seed hopper may gravity feed into the seed reservoir of the seed meter housing. Thus, the seed meters on most conventional modern planters are located eighteen to twenty-four inches above the ground surface and, as a result, require a seed tube to direct the seeds into the seed furrow after the singulated seeds are discharged from the seed meter. It should be appreciated, therefore, that as the planter traverses the field, some of the seeds may quickly free-fall through the eighteen to twenty-four inch long seed tube while other seeds may hit the sides of the tube and bounce within the tube before landing in the bottom of the furrow. The difference in time between those seeds which quickly fall through the tube versus those seeds that hit and bounce within the tube results in unwanted irregularities in the seed spacing.

Therefore, in some applications it may be desirable to eliminate the need for a seed tube altogether by mounting the seed metering device near the soil surface such that the singulated seeds are discharged from the seed metering device just a few inches above the bottom of the furrow. By mounting the seed meter near the bottom of the seed furrow, the seeds will be more accurately dispensed in the furrow and the irregularities in seed spacing caused by the seeds falling through the seed tube at different speeds will be significantly reduced if not completely eliminated. In this regard, it would be desirable to mount a seed meter such that it is disposed between the furrow opening assembly and the furrow closing wheel assembly of a conventional planter. Unfortunately, most commercially available vacuum-disk meters are too large in diameter or two wide to be disposed in the confined space between the furrow opening assembly and the closing wheels of a conventional planter.

Based on the foregoing, there is a need in the agricultural industry for a seed meter that provides accurate, consistent and uniform seed placement for various types of crops and can plant a wide range of seed populations without the need for changing out components. In addition, there is also a need in the industry for a seed metering and dispensing device that is readily adapted for retrofitting most conventional planters which will eliminate the need for seed tubes by being adapted for mounting between the furrow opening assembly and the furrow closing wheel assembly and near the soil surface such that the seeds are gently deposited directly in the seed furrow thereby improving seed placement accuracy.

SUMMARY OF INVENTION

A seed meter having a stationary housing defining a seed supply reservoir, a seed singulation area and a seed discharge area. The seed supply reservoir is in communication with a supply of seeds disposed within the seed hopper of the planter. The seed meter includes a rotatable drum disposed within the stationary housing. The rotatable drum has an interior vacuum chamber in communication with a vacuum source disposed on the planter. The rotatable drum further has an annular circumferential periphery with a plurality of equally spaced apertures therein and wherein at least a portion of the annular circumferential periphery rotates through the seed supply reservoir. The annular circumferential periphery of the drum is preferably V-shaped when viewed in cross section, but the circumferential periphery may also be beveled to one side or substantially horizontal in cross-section.

In operation, the suction force created by the vacuum source draws air through the apertures into the vacuum chamber thereby causing the seeds in the seed supply reservoir to be entrained over the apertures as the apertures rotate through the seed supply reservoir. A seed release is preferably disposed inside the rotatable drum in the seed discharge area. The seed release preferably has a portion biased against an inside surface of the annular circumferential periphery of the drum such that at least the portion of the seed release substantially covers at least one aperture at a time as the drum rotates such that the suction force through the apertures is substantially cut-off thereby gently releasing the seeds entrained over the apertures. In the preferred embodiment, a seed release disposed on the interior of the drum is used in combination with an exterior drum wiper secured to the housing in the seed discharge area of the meter to ensure that all seeds are removed from the apertures before the apertures re-enter the seed reservoir. In an alternative embodiment, the seed release may also utilize positive air pressure to discharge the entrained seed from the rotating drum. In yet a further embodiment, rather than using a seed release disposed on the interior of the drum, an exterior drum wiper, alone, may be used to remove the seeds from the apertures before the apertures re-enter the seed reservoir.

In a preferred embodiment, the seed meter is in communication with a seed hopper containing separate compartments for holding different varieties of seeds. In this preferred embodiment, the seed meter includes a diverter which can be manually or automatically triggered to switch between the different seed varieties while on-the-go.

The seed meter may be disposed below the seed hopper, as is conventional in most planters. However, the seed meter is preferably disposed near the soil surface, rearwardly adjacent the furrow opening assembly and forward of the furrow closing assembly of a conventional planter such that the seeds are discharged directly into the seed furrow thereby eliminating the need for a seed tube which effects the uniformity of seed placement in the furrow.

To the accomplishment of the above objects, features and advantages, this invention may be embodied in the forms illustrated in the accompanying drawings, attention being called to the fact, however, that the drawings are illustrative only, and the changes may be made in the specific form illustrated and described within the scope of the appended claims.

DETAILED DESCRIPTION

Figure 1:
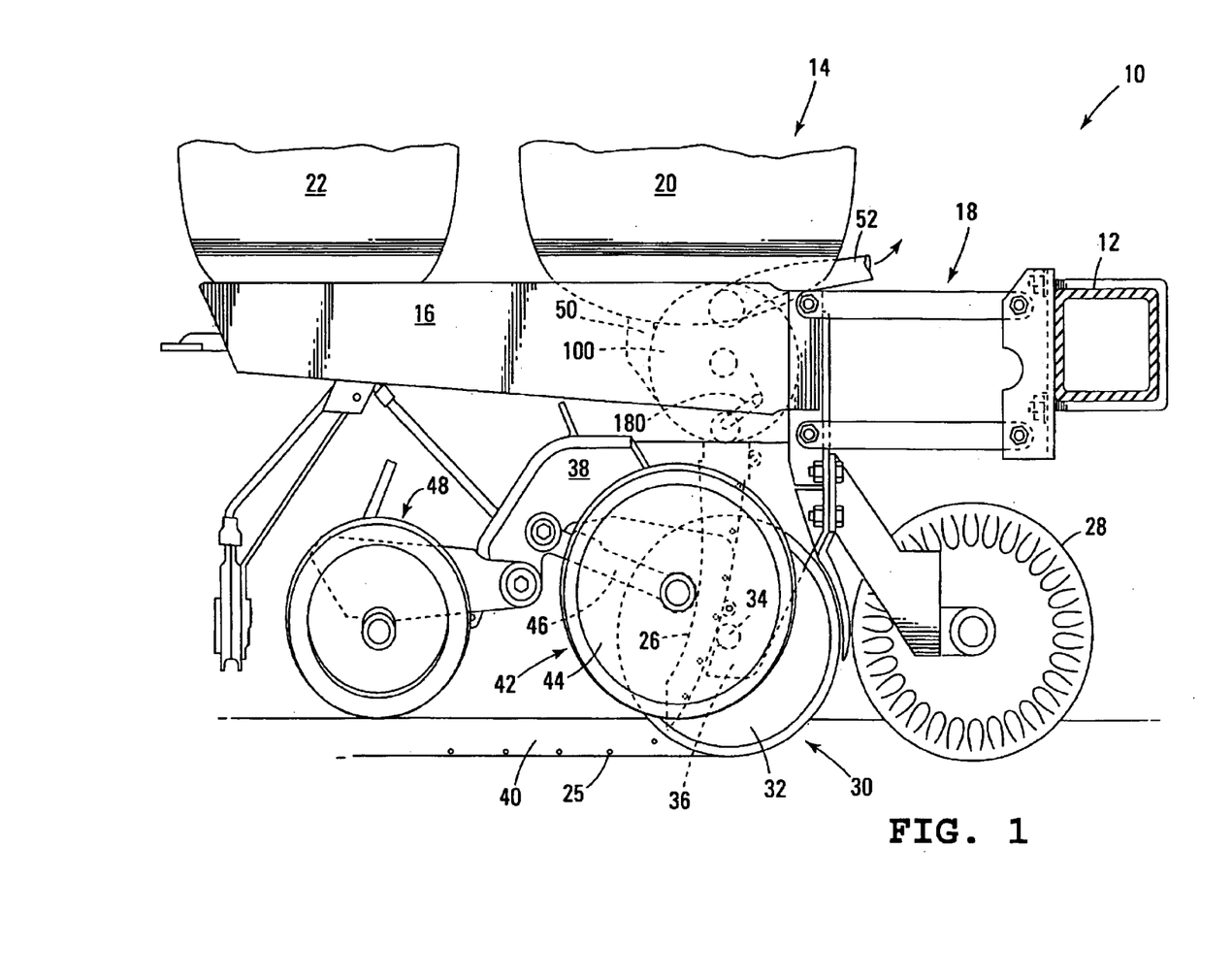
FIG. 1 shows a conventional agricultural planter illustrating the use of a conventional seed meter and seed dispensing tube.

Drawing FIG. 1 shows a modern agricultural planter 10, such as that disclosed in U.S. Pat. No. 4,009,668, the specification and drawings of which are incorporated herein by reference. As is conventional, the planter 10 includes a mobile main frame 12, only a portion of which is illustrated in FIG. 1. As is well known, the main frame 12 is conventionally attached to and towed by a tractor (not shown) and a number of individual row units 14 are spaced at intervals along the main frame 12. Each row unit 14 includes a row unit frame 16, which is vertically adjustable relative to the main frame 12 by a parallel linkage 18. Only one single row unit 14 is shown and described herein, and, as is conventional, each row unit 14 includes a seed hopper 20 and a fertilizer hopper 22 mounted on the row unit frame 16.

Each row unit 14 has a seed selection and dispensing device 100, commonly referred to as a seed meter, which receives seed from the seed hopper 20 and discharges the seed 25 into a seed tube 26 at regular intervals.

A coulter 28 is typically mounted on the row unit frame 14 forwardly of the furrow opening assembly 30. The furrow opening assembly 30, typically comprises a pair of generally vertical disks 32 that rotate on generally horizontal transverse shafts 34 supported by downwardly extending brackets 36 from a row unit subframe 38. The axes of the respective furrow opening disks 32 are slightly inclined relative to one another so that the disks 32 contact one another forwardly and bellow the disk axes. In operation, the lower portion of the furrow opening disks 32 are disposed below the surface of the soil so that the disks form a V-shaped furrow 40 as the planter 10 advances. The seed tube 26 deposits the seed in the furrow 40 behind the axis of the furrow opening disks 32. A gauge wheel assembly 42 is mounted on the row unit subframe frame 38 adjacent the furrow opening disks 32. The gauge wheel assembly 42 comprises a pair of gauge wheels 44 disposed adjacent the outer sides of the furrow opening disks 32. A gauge wheel arm 46 connects each gauge wheel 44 to the row unit subframe 38. As is well known, an adjustable stop (not shown) operates between the row unit subframe 38 and the gauge wheel arm 46 to limit the upward movement of the gauge wheel 44 relative to the row unit subframe 38. Since the gauge wheels 44 ride on the surface of the ground when the planter 10 is in operation, the vertical position of the gauge wheels 44 relative to the furrow opening disks 32 controls the depth of the furrow 40 opened by the disks 32. A furrow closing assembly 48 disposed rearwardly of the furrow opening assembly 30, closes the furrow 40 by pushing the soil back into the furrow over the planted seeds. All the above is described in greater detail in U.S. Pat. No. 4,009,668.

In regard to the furrow opening assembly 30, wherein the assembly 30 was described as typically comprising a pair of generally vertical disks 32, it should be appreciated that some conventional planters utilize a furrow opening assembly 30 having only one furrow opening disk 32, while still other furrow opening assemblies utilize a shovel or the like. Thus, it should be understood that reference to the furrow opening assembly 30 throughout this specification is intended to include any type of furrow opening assembly, whether comprised of a pair of disks, a single disk, a shovel, or any combination thereof, or any other means which is or may be employed to create a furrow in the soil. Similarly, reference to the furrow closing assembly 48 throughout this specification is intended to include any apparatus which is or may be employed for replacing the soil over the planted seed in the furrow.

Figure 2:
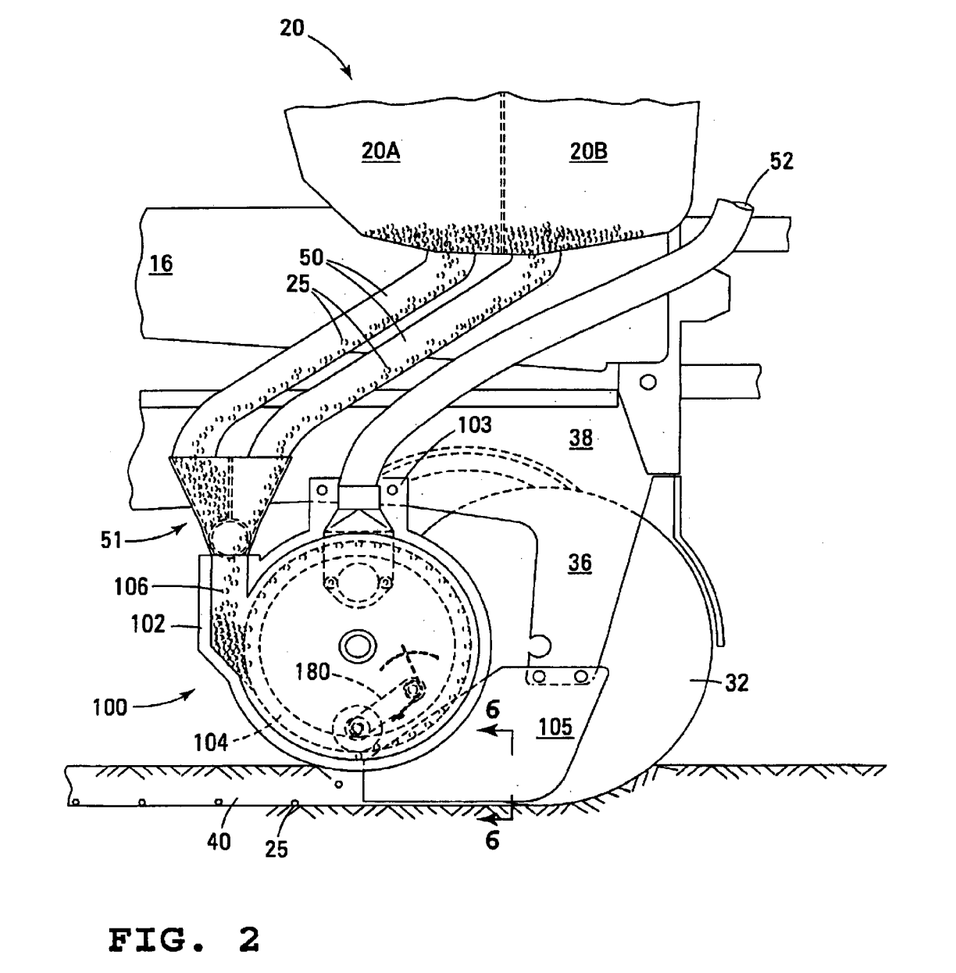
FIG. 2 shows the conventional agricultural planter of FIG. 1 with the seed meter and seed dispensing tube replaced with the preferred embodiment of the seed metering and dispensing device of the present invention.

Drawing FIG. 2 is intended to represent the same planter as in FIG. 1 except that the seed dispensing tube 26 is removed and the seed meter 100 is disposed near the soil surface and rearward of the furrow opening assembly 30 and forward of the furrow closing assembly 48 such that the seeds are discharged from the meter 100 directly into the bottom of the furrow 40, thereby ensuring seed placement accuracy by eliminating the spacing irregularities caused by the seeds being discharged into a seed tube.

FIG. 2 also illustrates a preferred embodiment of a planter 10 in which the seed hopper 20 is divided into at least two separate compartments 20A, 20B for holding different varieties of seeds. Feed tubes 50 communicate the seed 25 by gravity flow from each of the compartments 20A, 20B to the seed meter 100. As will be explained in greater detail later, a diverter 51 controls the flow of seeds from the compartments 20A, 20B into the seed supply reservoir of the seed meter 100. Additionally, a vacuum tube 52, as shown in FIGS. 1 and 2, is attached at one end to a suitable conventional vacuum source (not shown) and the other end is attached to the meter 100 to provide negative pressure to the interior of the vacuum drum of the seed meter as described in greater detail later. Although not shown, the planter 10 of FIG. 1 may also include a diverter 51 and divided seed hopper 20 to allow for planting two or more varieties of seeds as described in detail later.

Figure 6:
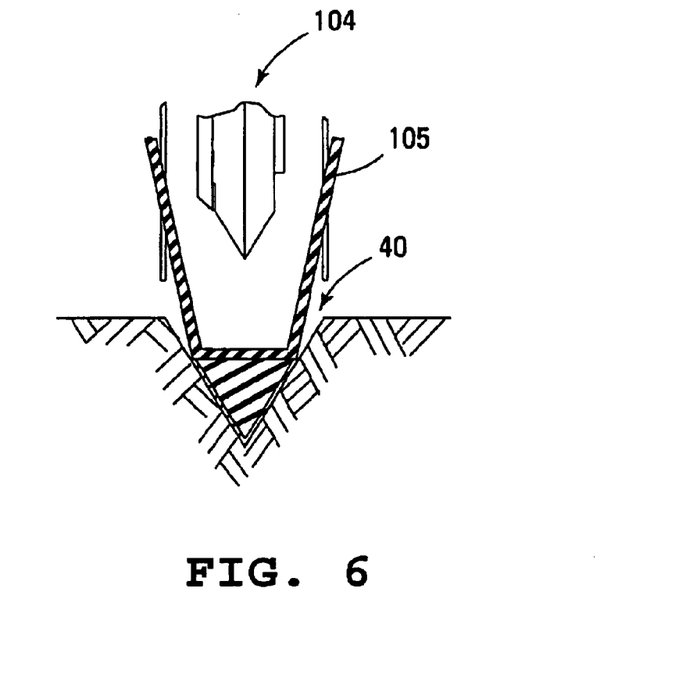
FIG. 6 shows a cross-sectional view of the boot as viewed along lines 6—6 of FIG. 2.

Continuing to refer to FIG. 2, the seed meter 100 includes a housing 102 having a bracket 103 secured thereto or preferably formed integral therewith. The bracket 103 may be removably mounted to the row unit frame 16 as in FIG. 1, or preferably to the row unit subframe 38 as shown in FIG. 2, such as by a bolted connection. On certain planters, such as most Deere and Kinze planters, when mounting the meter 100 to the row unit subframe 38 as shown in FIG. 2, the bracket 103 may be attached to the existing disk scraper mounting holes in the row unit subframe 38. In drawing FIG. 2, one of the furrow opening disks 32 and one of gauge wheels 40 have been removed for clarity to show the preferred positional relationship of the mounting of the meter 100 between the furrow opening assembly 30 and the furrow closing assembly 48. Additionally, as shown in FIG. 2, a conventional, commercially available boot 105 is preferably mounted to the downwardly extending bracket 36 of the row unit subframe 38 to protect the meter 100 from dirt and debris during planting operations. As best viewed in FIG. 6, a cross-sectional view of the boot 105 is illustrated showing the location of the boot 105 with respect to the rotatable drum 104 of the seed meter 100 and the furrow 40. The boot 105 may be made of any suitable wear resistant material such as a molded polymer material. On most Deere planters, the boot 105 may be attached directly to the bracket 36 using the existing seed tube guard mounting holes in the bracket 36.

Figure 3:
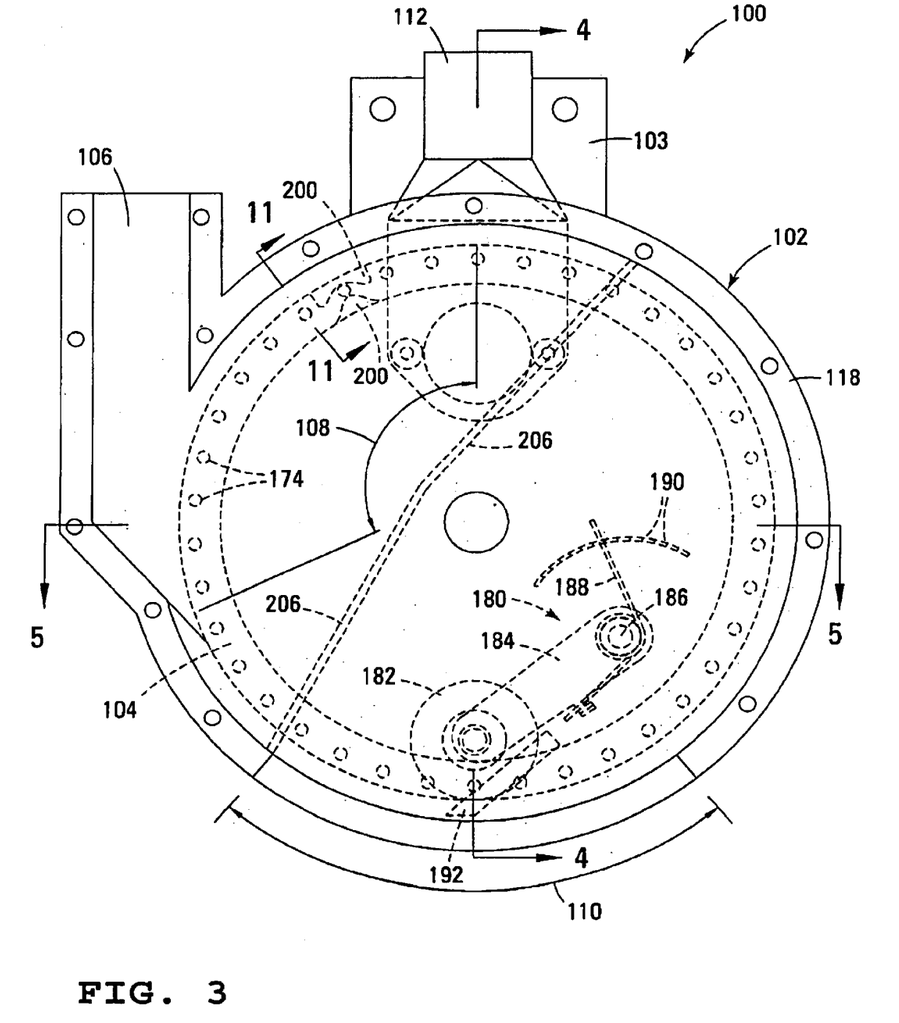
FIG. 3 shows a side elevation view of the preferred embodiment of the seed metering and dispensing device of the present invention.
Figure 4:
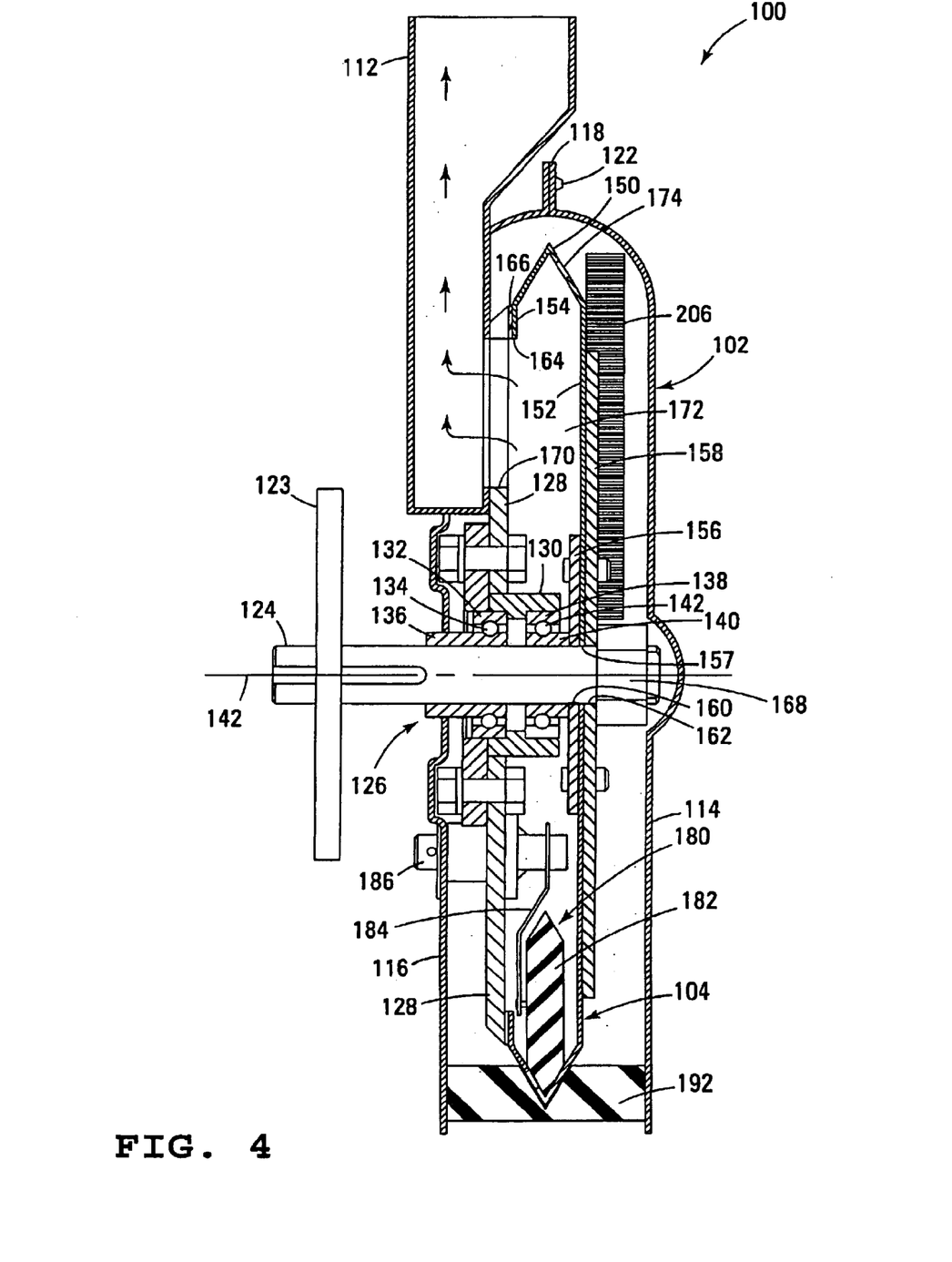
FIG. 4 shows a cross-sectional side elevation view of the preferred embodiment of the seed metering and dispensing device of the present invention as viewed along lines 4—4 of FIG. 3.
Figure 5:
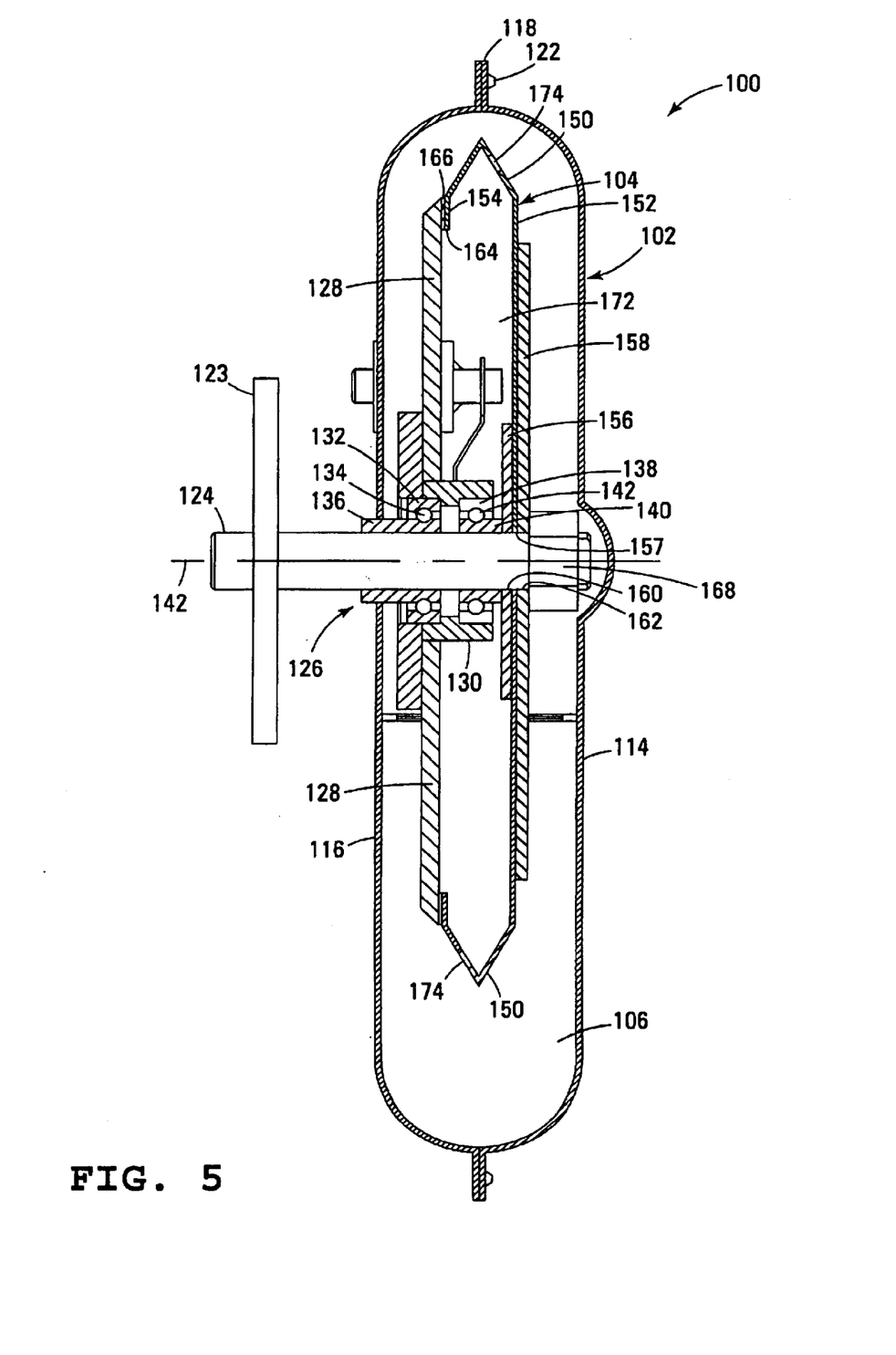
FIG. 5 shows a cross-sectional top plan view of the preferred embodiment of the seed metering and dispensing device of the present invention as viewed along lines 5—5 of FIG. 3.

FIG. 3 illustrates a more detailed side elevation view of the seed metering and dispensing device 100 of FIGS. 1 and 2. FIGS. 4 and 5 are cross-sectional views of the meter 100 as viewed along lines 4—4 and 5—5 of FIG. 3 respectively. Accordingly, referring to FIGS. 3–5, the metering and dispensing device 100 includes a housing 102 which substantially surrounds a rotatable vacuum drum 104. The housing 102 defines one seed supply reservoir 106 (FIGS. 3 and 5), a seed singulation area 108 (FIG. 3) and a seed discharge area 110 (FIGS. 3 and 4). Additionally, the housing 102 preferably includes a vacuum inlet portion 112 which receives one end of a vacuum tube 52 connected to any conventional vacuum source (not shown).

Figure 7:
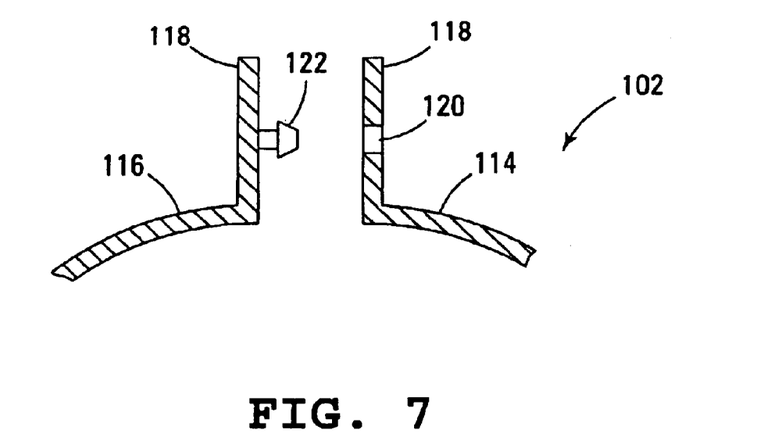
FIG. 7 shows a detailed view of the housing wall members illustrating the preferred embodiment for removably attaching the inner and outer wall members of the housing.

The housing 102 is preferably made of a wear resistant, rigid polymer material, but it may also be made out of other suitably wear resistant rigid material such as aluminum or steel. Preferably at least one wall 114 of the housing 102 is removable from the other wall 116 of the housing to gain access to the rotatable vacuum drum 104 disposed therein for cleaning and maintenance. Preferably, the walls 114, 116 of the housing 102 include lip portions 118 which can be removably secured together by fasteners, such as screws, clips or the like. In the preferred embodiment, the lip portion 118 of the removable wall 114 includes a plurality of apertures 120 (best viewed in FIG. 7) which receive deformable male studs 122 fixed to the lip portion 118 of the other wall member 114 of the housing 102.

As best viewed in FIGS. 4 and 5, a sprocket 123 is preferably secured to one end of a shaft 124. Preferably, a continuous chain (not shown) engages the sprocket 123 and a drive shaft (not shown) which allows the shaft 124 to rotate at various selected speeds independent of the ground speed of the planter. By allowing the shaft 124 to rotate at various speeds independent of the ground speed of the planter, the drum 104, which is preferably secured to the shaft 124 as described below, is able to rotate at various speeds in order to allow the operator to vary the seed population being planted. Naturally, various other drive mechanisms recognized by those skilled in the art may be used to rotate the shaft 124 and drum 104, and therefore the present invention should not be considered as limited to the use of a chain drive mechanism only.

The other end of the shaft 124 extends through the wall 116 of the housing 102 and is rotatably received by a bearing hub assembly 126 rigidly fixed to the housing wall 116. In an alternative embodiment, the bearing hub assembly 126 may be formed integral with the wall 116 of the housing 102. In a preferred embodiment, the bearing hub assembly 126 is comprised of an end plate 128 having a central bore to receive an annular flanged bearing member 130. Received within an inner portion of the annular flanged bearing member 130 is an outer raceway 132 for a first set of ball bearings 134. The outer raceway 132 is preferably removably fixed within the inner portion of the annular flanged bearing member 130. Also received within the inner portion of the annular flanged bearing member 130 is an inner raceway 136 for the first set of bearings 134. The inner raceway 136 is preferably removably fixed to the shaft 124, such as by a set screw, key or other conventional means of attachment. Disposed within the outer portion of the flanged bearing member 130 is a second set of inner and outer raceways 138, 140 and bearings 142. Again, the outer raceway 138 is preferably removably fixed within the outer portion of the annular flanged bearing member 130 and the inner raceway 140 is preferably removably fixed to the shaft 124 by any conventional means. It should be appreciated, therefore, that due to the bearing hub assembly 126, the shaft 124 and inner raceways 134, 140 removably fixed thereto, are free to rotate as a unit about their central axis 142 with respect to the stationary housing 102 and end plate 128.

Continuing to refer to FIGS. 4 and 5, the rotatable vacuum drum 104 is preferably fabricated from a wear resistant, blow-molded polymer material, but the drum 104 may also be fabricated from any other suitable wear resistant material including steel, aluminum, etc. The vacuum drum includes an annular circumferential outer periphery 150, outer wall portion 152 and an inner wall portion 154. The outer wall portion 152 includes a central bore 157 for receiving the end of the shaft 124. Inner and outer wall reinforcing plates 156, 158 also having a central bore 160, 162 for receiving the shaft 124 are preferably secured to the outer wall portion 152 to add structural rigidity to the vacuum drum 104. It should be appreciated, however, that if the outer wall portion 152 is sufficiently rigid, the inner and outer wall reinforcing plates 156, 158 may not be required.

The inner wall portion 154, is adjacently spaced in close proximity to the stationary end plate 128 and the inner wall portion 154 preferably includes a large central opening 164. An annular seal 166, preferably comprised of wear resistant, low friction material such as Teflon or the like, is disposed between the stationary end plate 128 and the inner wall portion 154 of the drum 104. A nut 168 disposed on the end of the shaft 124 removably fixes the drum 104 to the rotatable shaft 124 by an abutting connection between the face of the inner wall reinforcing plate 156 and the outer face of the inner raceway 140. The nut 168 also maintains the closely spaced adjacent relation between the inner wall portion 154 of the drum 104 and the stationary end plate 128 of the housing 102 such that a substantially air-tight seal is maintained between the inner wall portion 154 and the end plate 128. A bore 170 is located within the stationary end plate 128 over the location of the vacuum inlet 112 of the housing 102. Thus, it should be appreciated that a vacuum chamber 172 is created within the interior of the rotatable drum 104 and the seal 166 prevents air from entering between the inner wall portion 154 of the drum 104 and the housing 102.

Naturally, various embodiments of the drum 104 and bearing hub assembly 126 are possible without materially departing from the teachings herein. For example, as disclosed in U.S. Pat. Nos. 3,990,606 and 6,142,086, rather than having one end of the drum substantially open and sealed against a stationary end plate 128 of the housing 102, the drum 104 may be a substantially closed cylindrical drum with only a small central bore therethrough for receiving a tubular shaft which terminates in the interior vacuum chamber of the drum; the other end of the shaft being in direct communication with the vacuum source. Thus, the detailed description of the preferred embodiment of the drum 104 and bearing hub assembly 126 described herein should not be considered as limiting the scope of the present invention.

The annular circumferential periphery 150 of the rotatable drum 104 includes at least one row of equally spaced apertures 174. In operation, at least a portion of the annular circumferential periphery 150 of the drum 104 rotates through the seed reservoir 106 (FIGS. 2, 5). The seeds 25 in the seed reservoir 106 are entrained over the apertures 174 due to the suction force created by the negative pressure differential between the interior of the drum 104 and the atmospheric pressure on the exterior of the drum 104.

Figure 8A:
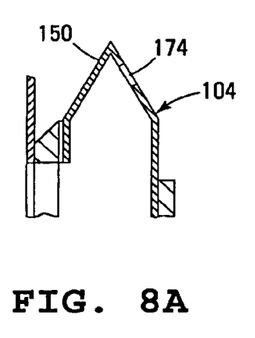
FIG. 8A shows a detailed cross-sectional view of the preferred embodiment of the circumferential outer periphery of the rotatable drum.
Figure 8B:
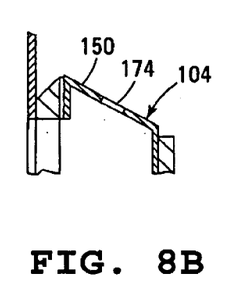
FIG. 8B shows a detailed cross-sectional view of an alternative embodiment of the circumferential outer periphery of the rotatable drum.
Figure 8C:
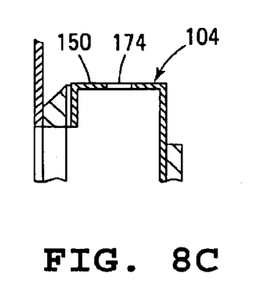
FIG. 8C shows a detailed cross-sectional view of another alternative embodiment of the circumferential outer periphery of the rotatable drum.

It is contemplated that the annular circumferential periphery 150 of the drum 104 may take any number of configurations such as those shown in FIGS. 8A–8C, for example. In the preferred embodiment, the annular circumferential periphery 150 of the drum 104 is substantially V-shaped when viewed in cross-section as shown in FIG. 8A. However, alternative embodiments may also be used. For example, the annular circumferential periphery 150 may be beveled to one side as shown in FIG. 8B, or, alternatively, the annular circumferential periphery 150 may be substantially horizontal when viewed in cross-section as illustrated in FIG. 8C. As best viewed in FIG. 12, the annular periphery 150 preferably has two rows of equally spaced apertures 174 with each row of apertures being offset from the other row of apertures by one-half the opposing aperture row spacing. By providing two offset rows of apertures 174, a smaller diameter drum 104 may be utilized then would otherwise be required if the drum had only a single row of apertures or if the seed meter utilized a disk as opposed to a drum. In the preferred embodiment the diameter of the drum is approximately eight to nine inches in diameter with thirty-eight apertures 174 in each row. Naturally, however, the diameter of the drum and the number of apertures may vary depending on seed population requirements, the speed of rotation of the drum, the space requirements within the drum for providing a seed release (discussed below) and the space available for mounting the meter 100 to the planter 10 either below the seed hopper 20 as shown in FIG. 1 or between the furrow opening assembly 30 and furrow closing assembly 48 as shown in FIG. 2.

A substantially V-shaped configuration of the annular circumferential periphery 150 of the drum 104 is preferred for a number of reasons. First, a V-shaped configuration allows for a greater number of sufficiently spaced apertures 174 in a smaller diameter drum to enable a single drum to plant a wider range of seed sizes and a wider range of seed populations. For example, when planting smaller round seeds, such as soybeans for example, the apertures 174 may be more closely spaced without the concern for a single seed bridging adjacently spaced holes. However, when planting larger flat seeds, such as corn for example, bridging is more of a concern. If bridging occurs due to the apertures being spaced too closely, a single seed will cover two apertures thereby resulting in unwanted gaps in seed spacing. Therefore, since it is desired to provide a seed meter that is capable of planting a wide range of various sizes and shapes of seeds and to also provide a seed meter capable of planting a wide range of seed populations without having to change-out components of the meter, the V-shape configuration allows for more apertures 174 in the same diameter as compared to a seed meter utilizing a flat vacuum disk plate, or even compared the alternative embodiments of the drum shown in FIG. 8B or 8C.

Second, since it is preferable to eliminate the need of a seed tube by mounting the meter 100 on a conventional planter near the soil surface between the furrow opening assembly 30 and the furrow closing assembly 48 such that the meter 100 dispenses the seeds directly into the seed furrow 40, the V-shaped configuration is preferred because the two offset rows of apertures 174 may be spaced more closely without the concern of bridging, thereby allowing the seeds dispensed from both rows of apertures to fall more closely along the centerline of the furrow. If the annular circumferential periphery 150 of the drum 104 is beveled or substantially horizontal as shown in FIGS. 8B and 8C, respectively, the seeds dispensed from the two rows of apertures will be offset a greater distance from the centerline of the furrow 40. On the other hand, if the meter 100 is mounted below the seed hopper 20 as shown in FIG. 1 such that the seeds are deposited into a seed tube 26, as is conventional, the closeness of the adjacently spaced aperture rows is not as big of a concern and therefore the alternative embodiments of FIGS. 8B and 8C are more than appropriate.

Third, the V-shaped annular circumferential periphery is preferred because the smaller the diameter of the drum 104 and the closer the adjacently spaced aperture rows can be, the smaller and narrower may be the profile of the drum 104 and housing 102, which is particularly important when mounting the meter 100 in the confined space between the furrow opening assembly 30 and furrow closing assembly 48 as shown in FIG. 2. It should be appreciated that reference to the annular circumferential periphery 150 as being preferably substantially V-shaped in cross-section is intended to include similar configurations that accomplish the above identified features and advantages of the V-shaped configuration, such as substantially U-shaped configurations, and the like.

Referring to FIGS. 3 and 4, disposed within the interior of the drum 104 at the seed discharge area 110 is a seed release 180 preferably comprising a rotatable wheel 182 biased against the interior surface of the annular circumferential periphery 150 of the drum 104. In operation, as the apertures 174 in drum 104 rotate past the stationary rotating wheel 182, the apertures are sealed off one at a time by a portion of the wheel 182 thus cutting off the effects of the vacuum source and thereby releasing the seeds entrained over the apertures 174 one at a time. The entrained seeds are therefore gently released such that the seeds fall into the seed tube as shown in FIG. 1, or directly into the seed furrow as shown in FIG. 2.

As best illustrated in FIG. 3, an arm 184 is pivotally connected to a shaft 186 fixed to the housing 102. A tension spring 188 is disposed around the shaft 186 with one end removably fixed to the pivotal arm 184 and the other end biased against a plurality of stops 190 projecting outwardly from the stationary end plate 128 toward the tension spring 188. The end of the tension spring 188 is preferably adjustable between the stops 190 to vary the amount of tension on the spring 188 to either increase or decrease the amount of radial force exerted on the wheel 182. Furthermore, the location of the seed release 180 is preferably adjustable within the interior of the drum 104 between approximately the four-o'clock to seven-o'clock position depending on the speed at which the drum 104 rotates for variations in desired seed population such that the seed, when released, falls vertically as it is released from the rotating drum 104. In addition to a seed release 180, a wiper 192 is also preferably disposed within the housing 102 to ensure the entrained seeds are removed from the apertures 174 before the apertures re-enter the seed reservoir 106.

Figure 9A:
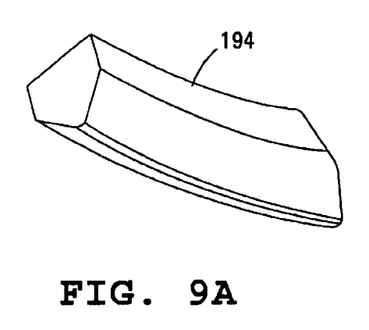
FIG. 9A shows a detailed view of an alternative embodiment of the seed release.
Figure 9B:
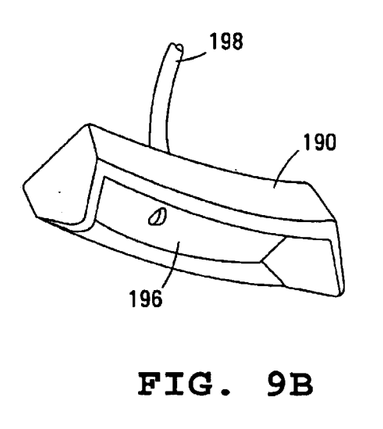
FIG. 9B shows a detailed view of another alternative embodiment of the seed release.

In an alternative embodiment, rather than utilizing a wheel 182, the seed release may be comprised of a shoe 194 biased against the interior surface of the annular circumferential periphery as shown in FIG. 9A. Additionally, the shoe 194 may have an open cavity 196 connected to a positive air source, such as by a tube or hose 198 as shown in FIG. 9B, which maintains a positive pressure within the open cavity 196 to improve the release of the seed from the effects of the vacuum source and to force out any entrained seeds that might otherwise become partially stuck in the aperture 174.

Figure 10:
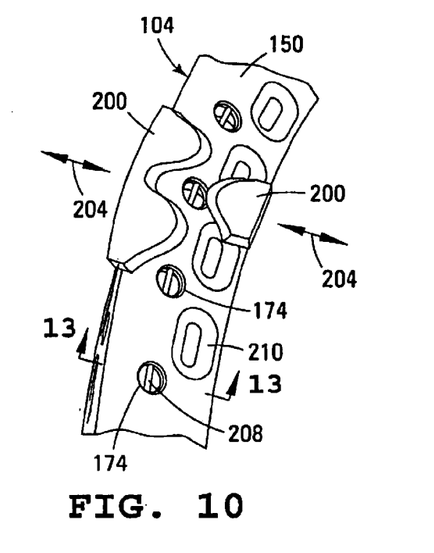
FIG. 10 shows the preferred embodiment of a seed stripper disposed on the preferred embodiment of the annular circumferential periphery of the drum.
Figure 11:
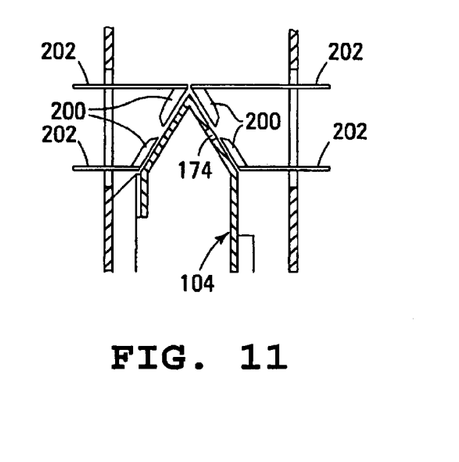
FIG. 11 shows a cross-sectional view of the drum and preferred seed stripper as viewed along lines 11—11 of FIG. 3 disposed on the preferred embodiment of the circumferential outer periphery of the drum.

FIG. 10 shows a preferred embodiment of the seed stripers 200 used to remove any multiple seeds that may be entrained over a single aperture 174 thereby leaving a single seed entrained over each aperture 174. The seed strippers 200 are preferably supported within the housing 102 by adjustable brackets 202 which allow the strippers 200 to move with respect to one another in the direction indicated by the arrows 204 depending on the various size and shaped seeds being planted. FIG. 11 shows a cross-sectional view of the drum 104 and seed strippers 200 as viewed along lines 11—11 of FIG. 3 illustrating the preferred arrangement of the seed strippers 200 on the annular circumferential periphery 150 of the rotating drum 104. Additionally, as shown in FIGS. 3 and 4, a brush 206 is disposed between the housing 102 and the drum 104 such that any seeds stripped from the apertures 174 by the seed strippers 200 are directed back into the seed supply reservoir 106. Although only one preferred embodiment of the seed stripper has been shown, it should be readily appreciated that the seed strippers 200 may also be any other type or configuration common in other seed metering devices, whether a saw tooth configuration, rollers, or the like.

Figure 12:
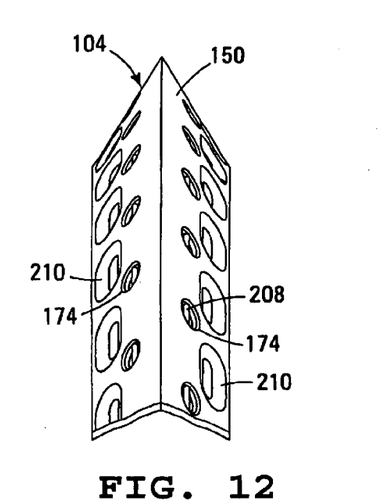
FIG. 12A shows a detailed view of a portion of the preferred annular circumferential periphery of the drum.
Figure 13:
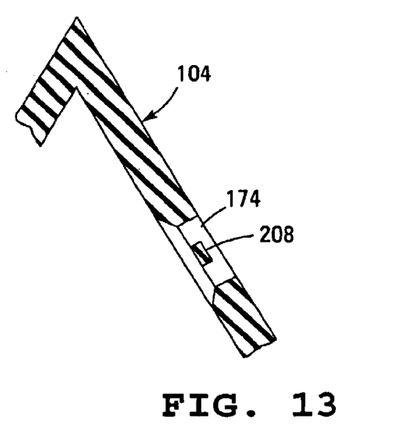
FIG. 13 shows a cross-sectional view of the preferred aperture detail as viewed along lines 13—13 of FIG. 10.

Referring now to FIGS. 12 and 13, to minimize seed doubles and to provide the ability to plant a broader range of seed types with the same size aperture in the drum 104, the apertures 174 preferably include a thin web or spline 208, thus splitting the aperture 174 substantially into two halves. The web 208 prevents narrow or elongated seeds from entering the apertures 174 where they might otherwise become stuck in the aperture or possibly get sucked into the interior vacuum chamber 172, yet the area of the aperture opening is still sufficient to entrain larger seeds such as corn or soybeans. FIG. 13 shows a cross sectional view of the aperture 174 as viewed along lines 13—13 of FIG. 10. As shown in FIG. 13, at each aperture 174, the inside of the annular circumferential periphery 150 of the drum 104 is preferably beveled which slightly increases the amount of suction force to entrain the seeds than would otherwise be achieved if the inside surface of the aperture was not beveled. The diameter of each aperture is preferably approximately 5 mm.

Referring now to FIGS. 10 and 12, the annular circumferential periphery 150 of the drum 104 preferably includes dimples 210 for agitating the seed in the seed supply reservoir 106 as the drum rotates in order to prevent the seeds from becoming packed within the reservoir 106, thereby enabling the seeds to be more readily entrained on the rotating drum 104. Rather than dimples 201, the drum 104 may instead have pegs which project outwardly to agitate the seeds in the reservoir 106. Alternatively, any other conventional means for agitation of the seed reservoir may be used, such as compressed air, vibration, etc.

Figure 14:
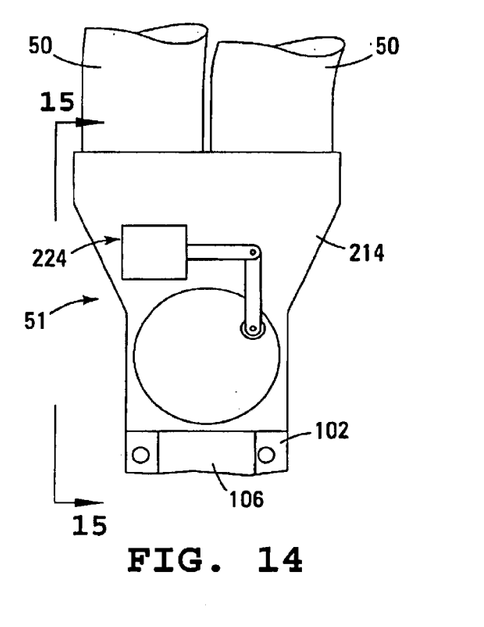
FIG. 14 shows a detailed side elevation view of the preferred diverter shown in FIG. 2.
Figure 15:
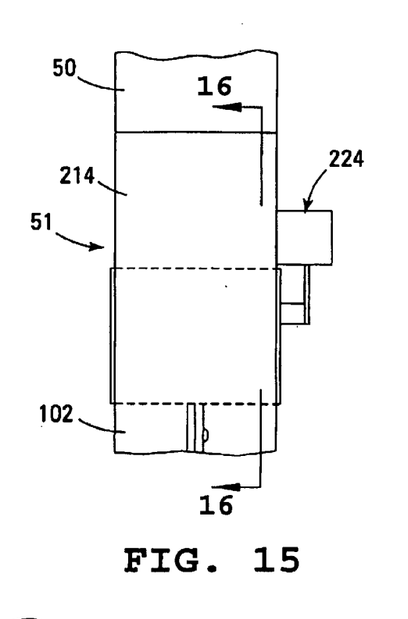
FIG. 15 shows a rear elevation view of the preferred diverter as viewed along lines 15—15 of FIG. 14.
Figure 16:
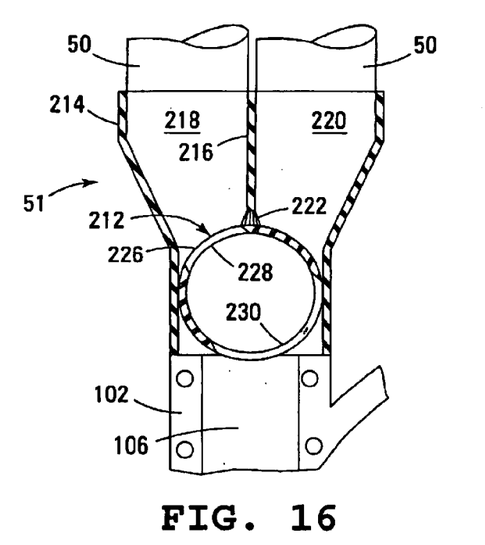
FIG. 16 shows a detailed cross-sectional view of the preferred diverter as viewed along lines 16—16 of FIG. 15.

FIG. 14 shows a detailed side-elevation view of the preferred diverter 51 shown generally in FIG. 2. FIG. 15 shows a rear elevation view of the preferred diverter 51. FIG. 16 shows an enlarged cross-sectional view of the preferred diverter 51 as viewed along lines 16—16 of FIG. 15. The preferred diverter 51 is preferably comprised of a valve 212 rotatably disposed in an adapter 214 which mounts to the inlet of the seed reservoir 106 of the housing 102. The adapter 214 preferably includes a separating wall 216 which divides the adapter into at least two compartments 218, 220, each compartment being in communication with a feed tube 50 which is in-turn in communication with one of the compartments 20A, 20B of the seed hopper 20 as discussed above. A brush 222 preferably extends between the separating wall 216 and the valve 212 to prevent the different seed varieties in each compartment 218, 220 from mixing. Referring to FIG. 14, an actuator 224, such as a solenoid, is mounted to the exterior of the adapter 212 and is pivotally linked to the valve 212 for moving the valve to selectively open and close the compartments 218, 220. In the preferred embodiment, the valve 212 is preferably comprised of a cylinder 226 rotatably secured in the adapter 214. The cylinder 226 includes two openings 228, 230 on opposing sides of the cylinder 226. During the planting operations, when it is desired to switch between seed varieties, the planter operator can preferably actuate the actuator 224 by flipping a switch in the cab of the tractor which is electrically connected to the actuator 224. Actuation of the actuator 224 causes the cylinder 226 to rotate which opens one of the compartments 218, 220 and closes the other compartment 218, 220 such that the seeds in the open compartment can enter the seed reservoir 106 of the housing. When it is desired to switch back to the previous variety of seed, the valve 212 rotates the opposite direction thereby closing off the previously opened compartment and opening the previously closed off compartment. Various alternate embodiments of the diverter 51 may be used to accomplish the objective of allowing different varieties of seeds to be planted while on-the-go, therefore the scope of the invention should not be considered as limited to the preferred embodiment described herein.

When using a diverter 51, it should be appreciated that the volume of the seed reservoir 106 must not be too large such that a large quantity of a particular variety of seeds are retained. Otherwise, by the time first variety of seeds in the seed reservoir 106 are used up, the planter may have already passed the location in which it was desired to plant the second variety of seeds. Thus, it is preferred that the seed reservoir 106 retain no more seeds than will be dispensed within fifty to seventy-five feet. Naturally the volume of the seed reservoir and the quantity of seeds retained therein may vary as desired and therefore, the above-described preferred volume should not be considered as a limitation to the scope of the invention.

Furthermore, it should be readily appreciated that rather than providing a diverter 51 for planting only two seed varieties, it may be desirable to have the ability to switching between planting three or more seed varieties. This may be accomplished by providing multiple diverters 51 or providing a single diverter with an adapter 214 having multiple compartments and a valve 212 having multiple positions for opening and closing the various compartments, such as by a rotatable disk with an opening movable between the multiple compartments. Furthermore, rather than the planter operator manually controlling the diverter 51 by flipping a switch in the tractor cab, it would be desirable to electrically couple the diverter actuator to the farmer's GPS system and field mapping system such that the diverter is automatically actuated as the planter traverses the field. Those skilled in the art would readily appreciate how to electronically couple the diverter 51 to a field mapping and GPS system and therefore further discussion is not warranted.

Although only certain exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A seed meter for a seed planter, comprising:
   a drum having an interior chamber in communication with a vacuum source, said drum further having an exterior circumferential periphery with a plurality of spaced apertures therethrough in communication with said interior chamber;
   a shaft rotatably supporting said drum such that at least a portion of said exterior circumferential periphery of said drum is in communication with a seed reservoir through which said apertures succeedingly rotate, wherein seeds in said seed reservoir become entrained over said apertures as a result of a lower atmospheric pressure within said interior chamber created by said vacuum source;
   at least one seed stripper disposed above said exterior circumferential periphery of said rotatable drum for removing any seed multiples entrained over any one of said apertures;
   a seed release disposed within said interior chamber over which said entrained seeds succeedingly rotate, said seed release succeedingly blocking said lower atmospheric pressure thereby succeedingly releasing the seeds entrained over said apertures.

2. The seed meter of claim 1 wherein said exterior circumferential periphery of said rotatable drum includes at least one sloped face.

3. The seed meter of claim 2 wherein said exterior circumferential periphery of said rotatable drum includes dimples for agitating the seeds in said seed reservoir as said at least a portion of said exterior circumferential periphery rotates therethrough.

4. The seed meter of claim 2 wherein said exterior circumferential periphery is V-shaped in cross-section.

5. The seed meter of claim 2 wherein said at least one seed stripper is movable in a direction substantially parallel in cross-section to said sloped face.

6. The seed meter of claim 2 wherein said rotatable drum is disposed for rotation within a housing comprising a first wall and a second wall, said first wall removably attached to said second wall.

* * * * *